United States Patent
Che et al.

(10) Patent No.: US 11,866,535 B2
(45) Date of Patent: Jan. 9, 2024

(54) TWO-PART EPOXY BASED COMPOSITION

(71) Applicant: Henkel AG & Co. KGaA, Düsseldorf (DE)

(72) Inventors: AiFu Che, Shanghai (CN); Chunfu Chen, Kanagawa (JP); Bin Li, Shanghai (CN); Chao Wang, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 242 days.

(21) Appl. No.: 17/153,027

(22) Filed: Jan. 20, 2021

(65) Prior Publication Data

US 2021/0171694 A1   Jun. 10, 2021

Related U.S. Application Data

(63) Continuation of application No. PCT/CN2018/097342, filed on Jul. 27, 2018.

(51) Int. Cl.
- *C09J 163/00* (2006.01)
- *C08G 59/44* (2006.01)
- *C08G 59/46* (2006.01)
- *C08F 283/10* (2006.01)

(52) U.S. Cl.
CPC ................. *C08F 283/10* (2013.01)

(58) Field of Classification Search
None
See application file for complete search history.

(56) References Cited

U.S. PATENT DOCUMENTS

| | | | |
|---|---|---|---|
| 3,878,247 A * | 4/1975 | Moss | C08G 59/54 564/204 |
| 4,188,474 A * | 2/1980 | Waddill | C08G 59/686 525/530 |
| 8,895,148 B2 | 11/2014 | Sang et al. | |
| 2003/0004296 A1 | 1/2003 | Koto et al. | |
| 2011/0120646 A1* | 5/2011 | Gorodisher | C08L 63/00 525/530 |

FOREIGN PATENT DOCUMENTS

| | | |
|---|---|---|
| CN | 101412896 A | 4/2009 |
| EP | 0301433 A2 | 2/1989 |
| JP | 34829792 B1 | 9/1973 |

OTHER PUBLICATIONS

International Search Report for International PCT Patent Application No. PCT/CN2018/097342 dated Apr. 29, 2019.

* cited by examiner

*Primary Examiner* — Michael J Feely
(74) *Attorney, Agent, or Firm* — James E. Piotrowski

(57) ABSTRACT

This invention relates to a two-part epoxy based composition, comprising a first part comprising at least one epoxy resin; a second part comprising at least one epoxy resin curing agent, and at least one acrylamide compound containing a hydrogen atom bound to the nitrogen atom in the acrylamide structure. The two-part epoxy based composition according to the present invention exhibits excellent adhesion strength to low surface tension substrates, such as stainless steel and PVC.

11 Claims, No Drawings

TWO-PART EPOXY BASED COMPOSITION

TECHNICAL FIELD

This invention relates to a two-part epoxy based composition, comprising a first part comprising at least one epoxy resin; a second part comprising at least one epoxy resin curing agent, and at least one acrylamide compound containing a hydrogen atom bound to the nitrogen atom in the acrylamide structure. The two-part epoxy based composition according to the present invention exhibits excellent adhesion strength to low surface tension substrates, such as stainless steel and PVC.

BACKGROUND OF THE INVENTION

Low surface tension substrates, such as stainless steel and polyvinyl chloride (PVC), are widely used in automotive and aerospace industries due to its good mechanical strength, chemical stability, and corrosion resistance. In many occasions, the low surface tension substrates may need to be attached together or to be bonded with other materials. The existing adhesives, however, have trouble to make intimate contact with the surface of the low surface tension substrates and therefore, the low surface tension substrates are not easily bonded.

Traditionally, low surface tension substrates need to be mechanically attached or solvent welded because adhesive bonding did not work well with these materials. However, mechanical attachments, such as clips and screws, can cause stress concentrations which may result in cracking and premature failures of the low surface tension substrates. Solvent welding has the problem of relying on the use of hazardous and noxious solvents which is undesirable for the health of workers.

Surface modification is an alternative way to bond low surface tension substrates. Techniques, such as flame, plasma treatment, and acid etching, are able to change the chemical composition of the surface to increase the surface energy, so that it will be easier for adhesives to flow out on or wet the treated surface and make a suitable bond. However, the additional surface modification step is costly and adds the complexity of the application of low surface tension substrates.

Therefore, there is a need for developing an epoxy based composition, which can be easily applied to low surface tension substrates for bonding and achieve high bonding strength.

SUMMARY OF THE INVENTION

The present invention relates to a two-part epoxy based composition, comprising:
(a) a first part comprising at least one epoxy resin;
(b) a second part comprising:
  (i) from 5 to 75% by weight of the second part of at least one epoxy resin curing agent; and
  (ii) from 25 to 95% by weight of the second part of at least one acrylamide compound represented by the following general formula (1):

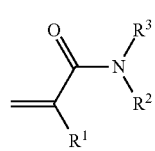

(1)

wherein $R^1$, $R^2$ and $R^3$ are identical or different, and independently represent hydrogen atoms, or optionally substituted univalent organic groups; and wherein at least one of $R^2$ and $R^3$ is a hydrogen atom.

The two-part epoxy based composition of the invention exhibits high bonding strength to low surface tension substrates, such as PVC and stainless steel.

The present invention also relates to a cured product of the two-part epoxy based composition.

The present invention also relates to an article bonded by the two-part epoxy based composition.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "organic group" refers to a group that includes at least one carbon atom. Exemplary of the organic group includes but not limited to an alkyl group, such as methyl, ethyl, propyl, butyl, pentyl, hexyl, isopropyl, tertiary butyl, isobutyl, chloromethyl, 3,3,3-trifluoropropyl and the groups alike; an alkenyl group, such as vinyl, allyl, butenyl, pentenyl, hexenyl and the groups alike; an aralkyl group, such as benzyl, phenethyl, 2-(2,4,6-trimethylphenyl)propyl and the groups alike; or an aryl group, such as phenyl, tolyl, xyxyl and the groups alike; an amino group, such as methylamino, dimethylamino, diethylamino, dibenzylamino and the groups alike; and an alkoxyl group, such as methoxyl, ethoxyl, butoxyl and the groups alike.

The term "tertiary amino group" refers an amino group in which the nitrogen atom is bound to three organic groups, such that two of these groups together may also be part of a ring.

The First Part

The first part of the present invention comprises at least one epoxy resin. The epoxy resin of the first part refers to any common epoxy resin containing at least one epoxy group per molecule, and preferably containing multiple epoxy groups per molecule. Exemplary of the epoxy resin includes but not limited to bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, and any combination thereof.

Examples of commercially available epoxy resin are, for example, D.E.R. 331 from Olin Corporation; EPON 828 from Shell Chemical Corporation; and EPICLON N-665 from Dainippon Ink and Chemicals Inc.

In some embodiments of the present invention, the amount of the epoxy resin in the first part is from 20 to 100%, preferably from 50 to 90%, and more preferably from 80 to 90% by weight based on the total weight of the first part.

The first part of the present invention may optionally further comprise additives, such as at least one first filler. The first filler may be an organic filler, an inorganic filler and the combination thereof. The first filler may function as a structural reinforcement component, a thermally conducting component, an electrically conducting component, and an adhesion promoting component. Suitable first filler includes but not limited to silica, alumina, zinc oxide, boron nitride, glass fibers and the likes. Examples of commercially available first fillers are, for example, TS720 from Cabot; and Aerosil R202 from Evonik.

In some embodiments of the present invention, the amount of the first filler in the first part is from 0 to 80%, preferably from 0 to 50%, and more preferably from 10 to 20% by weight based on the total weight of the first part.

The Second Part

The second part of the present invention comprises at least one epoxy resin curing agent. The epoxy curing agent of the second part refers to any commonly used curing agent for epoxy systems, and includes but not limited to polyamide, amine, imidazole and the derivatives thereof. Illustrative curing catalysts include polyamide resin based on dimerized fatty acid and polyamines, methyldiethanolamine, triethanolamine, diethylaminopropylamine, benzyldimethyl amine, m-xylylenedi(dimethylamine), benzyldimethylamine, 2,4,6-tris(dimethylaminomethyl)phenol, 1-methylimidazole, 2-methylimidazole and 2,4-diethylimidazole.

Examples of commercially available epoxy curing agent, for example, are Versamid 140 from Gabriel Performance Products; Ancamine TEPA from Evonik; Ajicure PN—H from Ajinomoto Fine-Techno Co., Ltd.; Fujicure-FXR-1090FA from T&K Toka; 1,2-dimethyl imidazole from Shikoku Chemicals Corporation; 2E4MI, from Evonik; and Gaskamine 240 from Mitsubishi Gas Chemical.

In some embodiments of the present invention, the amount of the epoxy curing agent in the second part is from 5 to 75%, preferably from 10 to 70%, and more preferably from 10 to 50% by weight based on the total weight of the second part.

The second part of the present invention also comprises at least one acrylamide compound represented by the following general formula (1):

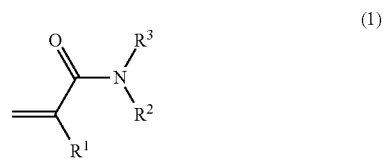

In the general formula (1), $R^1$, $R^2$ and $R^3$ are identical or different, and independently represent hydrogen atoms, or optionally substituted univalent organic groups; and at least one of $R^2$ and $R^3$ is a hydrogen atom. Not binding by any theory, it is believed that the hydrogen atom which is bound to the nitrogen atom in the acrylamide structure in the general formula (1) reacts with the epoxy ring in the epoxy resin and therefore helps the curing of the two-part epoxy based composition.

In some embodiments of the present invention, it is preferable that at least one of $R^1$, $R^2$ and $R^3$ in the general formula (1) contains a tertiary amino group. More preferably, at least one of $R^2$ and $R^3$ in the general formula (1) contains a tertiary amino group. Not binding by any theory, it is believed that the tertiary amino group functions to catalyze the curing of the epoxy resin, and therefore further helps the curing of the two-part epoxy based composition.

In some embodiments of the present invention, it is preferable that at least one of $R^1$, $R^2$ and $R^3$ in the general formula (1) is a group represented by the following general formula (2):

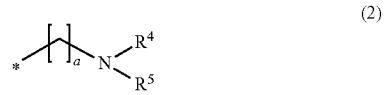

In the general formula (2), * represents a bonding position to the nitrogen atom in the acrylamide structure in the general formula (1); $R^4$ and $R^5$ are identical or different, and independently represent hydrogen atoms, and optionally substituted univalent organic groups; a is an integer from 1 to 20, and preferably from 1 to 10. More preferably, $R^4$ and $R^5$ in the general formula (2) are optionally substituted $C_1$ to $C_6$ univalent organic groups, such as methyl, ethyl and vinyl groups.

Representative examples of the acrylamide compound of the present invention are:

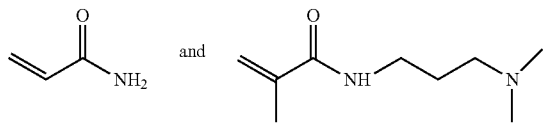

Examples of commercially available acrylamide compound represented by the general formula (1), for example, are Visiomer DMAPMA from Evonik; and DMAPMA from Feixiang Group of Companies.

In some embodiments of the present invention, the amount of the acrylamide compound represented by the general formula (1) in the second part is from 25 to 95%, preferably from 30 to 90%, and more preferably from 50 to 70% by weight based on the total weight of the second part.

The second part of the present invention may optionally further comprise additives, such as at least one coupling agent, and at least one second filler.

The coupling agent of the present invention may be any common coupling agent known in the art. The coupling agent may be selected from a silane coupling agent, a titanate coupling agent, or the like. The coupling agent of the present invention can be used alone or in combination. The silane coupling agent can be exemplified by epoxy-containing alkoxysilane, such as 3-glycidoxypropyl trimethoxysilane, 3-glycidoxypropyl methyldiethoxysilane, and 3-glycidoxypropyl triethoxysilane; amino-containing alkoxysilane, such as gamma-aminopropyl trimethoxysilane, gamma-aminopropyl triethoxysilane, gamma-aminopropyl triisopropoxysilane, and gamma-aminopropylmethyl dimethoxysilane; and mercapto-containing alkoxysilane, such as 3-mercaptopropyl trimethoxysilane. The titanate coupling agent can be exemplified by i-propoxytitanium tri(i-isostearate). Examples of commercially available coupling agents are, for example, KMB403, KMB 603 from Shin-Etsu Chemical; SILQUEST A187, SILQUEST A1120 from Momentive; and GENIOSIL GF9 from Wacker Chemie AG.

In some embodiments of the present invention, the amount of the second filler in the second part is from 0 to 80%, and preferably from 0 to 50% by weight based on the total weight of the second part.

The second filler of the present invention may be the same or different from the first filler. The second filler may be an organic filler, an inorganic filler and the combination thereof. The second filler may function as a structural reinforcement component, a thermally conducting component, an electrically conducting component, and an adhesion promoting component.

Suitable second filler includes but not limited to silica, alumina, zinc oxide, boron nitride, glass fibers and the likes. Examples of commercially available second fillers are, for example, TS720 from Cabot; and Aerosil R202 from Evonik.

In some embodiments of the present invention, the amount of the second filler in the second part is from 0 to 80%, and preferably from 0 to 50% by weight based on the total weight of the second part.

In a preferred embodiment, the two-part epoxy based composition comprises:
(a) a first part comprising at least one epoxy resin;
(b) a second part comprising:
  (i) from 5 to 75% by weight of at least one epoxy resin curing agent;
  (ii) from 25 to 95% by weight of at least one acrylamide compound represented by the following general formula (1):

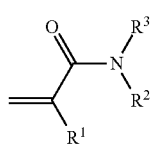
(1)

wherein $R^1$ represents a hydrogen atom or an optionally substituted $C_1$ to $C_6$ univalent organic group; and wherein one of $R^2$ and $R^3$ is a hydrogen atom, and the other one of $R^2$ and $R^3$ is a group represented by the following formula (2),

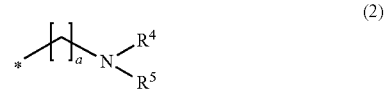
(2)

wherein * represents a bonding position to the nitrogen atom in the acrylamide structure in the general formula (1); R4 and R5 are identical or different, and independently represent optionally substituted $C_1$ to $C_6$ univalent organic groups; and a is an integer from 1 to 10.

The first part should be used in a weight ratio to the second part, in the range of 20:1 to 1:1, preferably from 10:1 to 1.5:1, and more preferably from 2:1 to 1.5:1. A person skilled in the art will be able to make appropriate choices among the various components based on the description, representative examples and guidelines of the present invention to prepare a composition to achieve desired effects.

The first part and the second part should be combined 10 to 30 minutes prior to the use of the two-part epoxy based composition for substrate bonding.

The two-part epoxy based composition of the present invention may be prepared by:
(a) preparing a first part by obtaining an epoxy resin;
(b) preparing a second part by mixing an epoxy curing agent with an acrylamide compound represented by the general formula (1),

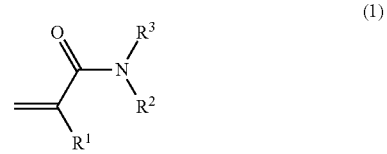
(1)

wherein $R^1$, $R^2$ and $R^3$ are identical or different, and independently represent hydrogen atoms, or optionally substituted univalent organic groups; and at least one of $R^2$ and $R^3$ is a hydrogen atom.
(c) combining the first part with the second part in a weight ratio of 20:1 to 1:1.

The two-part epoxy based composition of the present invention may be cured in a temperature range from 20 to 80° C. and applied to substrates by a mixing gun.

The lap shear strength of the two-part epoxy based composition of the present invention may be assessed according to ASTM D 1002.

The two-part epoxy based composition of the present invention preferably has a lap shear strength greater than or equal to 2 Mpa, and more preferably greater than or equal to 5 Mpa after being applied to rigid PVC.

The two-part epoxy based composition of the present invention preferably has a lap shear strength greater than or equal to 4 Mpa, and more preferably greater than or equal to 5 Mpa after being applied to stainless steel.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Example 1

A first part of the two-part epoxy based composition sample was prepared according to Table 1A by obtaining difunctional bisphenol A/epichlorohydrin derived liquid epoxy resin (Epon 828, from Momentive);

A second part of the two-part epoxy based composition sample was prepared according to Table 1B by mixing polyamide resin (Versamid 140, from Gabriel Performance Products), tetraethylene pentamine (Ancamine TEPA, from Evonik), and N-[3-(dimethylamino)propyl]-2-methacrylamide (Visiomer DMAPMA, from Evonik).

The first part and the second part of the two-part epoxy based composition sample were mixed in a weight ratio of 1.9:1 and were mixed together 20 minutes before the lap shear strength test was conducted. The two-part epoxy based composition sample was cured at room temperature.

Example 2

A first part and a second part of the two-part epoxy based composition sample were prepared in the same way as in Example 1, according to Table 1A and 1B.

The first part and the second part of the two-part epoxy based composition sample were mixed in a weight ratio of 1.8:1 and were mixed together 20 minutes before the lap shear strength test was conducted. The two-part epoxy based composition sample was cured at room temperature.

Example 3

A first part and a second part of the two-part epoxy based composition sample were prepared in the same way as in Example 1, according to Table 1A and 1B.

The first part and the second part of the two-part epoxy based composition sample were mixed in a weight ratio of 1.8:1 and were mixed together 20 minutes before the lap shear strength test was conducted. The two-part epoxy based composition sample was cured at room temperature.

Example 4

A first part and a second part of the two-part epoxy based composition sample were prepared in the same way as in Example 1, according to Table 1A and 1B.

The first part and the second part of the two-part epoxy based composition sample were mixed in a weight ratio of 1.7:1 and were mixed together 20 minutes before the lap shear strength test was conducted. The two-part epoxy based composition sample was cured at room temperature.

Example 5

A first part and a second part of the two-part epoxy based composition sample were prepared in the same way as in Example 1, according to Table 1A and 1B. N, N-dimethyl acrylamide (DMAA, from Eastman) was used instead of N-[3-(dimethylamino)propyl]-2-methacrylamide (Visiomer DMAPMA, from Evonik).

The first part and the second part of the two-part epoxy based composition sample were mixed in a weight ratio of 1.27:1 and were mixed together 20 minutes before the lap shear strength test was conducted. The two-part epoxy based composition sample was cured at room temperature.

Example 6

A first part and a second part of the two-part epoxy based composition sample were prepared in the same way as in Example 1, according to Table 1A and 1B.

The first part and the second part of the two-part epoxy based composition sample were mixed in a weight ratio of 1.9:1 and were mixed together 20 minutes before the lap shear strength test was conducted. The two-part epoxy based composition sample was cured at room temperature.

Example 7

A first part and a second part of the two-part epoxy based composition sample were prepared in the same way as in Example 1, according to Table 1A and 1B. No N-[3-(dimethylamino)propyl]-2-methacrylamide (Visiomer DMAPMA, from Evonik) was incorporated in the two part epoxy based composition sample.

The first part and the second part of the two-part epoxy based composition sample were mixed in a weight ratio of 2:1 and were mixed together 20 minutes before the lap shear strength test was conducted. The two-part epoxy based composition sample was cured at room temperature.

Test Methods

Lap Shear Strength

The lap shear strength of the two-part epoxy based composition was determined according to ASTM D 1002, and the two part epoxy based composition tested had a thickness of 0.127 mm between the testing samples of rigid PVC panels or 301 stainless steel panels. For this test procedure, MTS Criterion Model 43 (from MTS Systems Corporation) was used.

TABLE 1A

First part of the two-part epoxy based composition

| | Weight % | | | | | | |
|---|---|---|---|---|---|---|---|
| Components | Example 1 | Example 2 | Example 3 | Example 4 | Example 5 | Example 6 | Example 7 |
| Epon 828 | 100 | 100 | 100 | 100 | 100 | 100 | 100 |

TABLE 1B

Second part of the two-part epoxy based composition

| Components | Weight % | | | | | | |
|---|---|---|---|---|---|---|---|
| | Example 1 | Example 2 | Example 3 | Example 4 | Example 5 | Example 6 | Example 7 |
| Versamid 140 | 60 | 40 | 20 | | 40 | 70 | 90 |
| Ancamine TEPA | 10 | 10 | 10 | 10 | 10 | 10 | 10 |
| Visiomer DMAPMA | 30 | 50 | 70 | 90 | | 20 | |
| DMAA | | | | | 50 | | |

In Table 2, the lap shear strength of the two-part epoxy based composition samples to rigid PVC panels is reported. The two-part epoxy based composition samples in Examples 1-4 had good lap shear strength to rigid PVC panels. Especially in Examples 2 to 4, the lap shear strength of the two-part epoxy based composition were further improved.

When incorporating an acrylamide compound without a hydrogen atom bound to the nitrogen atom that is in the acrylamide structure as in Example 5, the lap shear strength of the two-part epoxy based composition sample was weak. Similarly, when no acrylamide compound was added as in Example 7, the lap shear strength of the two-part epoxy based composition was weak too.

TABLE 2

Lap shear strength of the two-part epoxy based composition to rigid PVC panel

| | Example 1 | Example 2 | Example 3 | Example 4 | Example 5 | Example 6 | Example 7 |
|---|---|---|---|---|---|---|---|
| Lap shear strength (Mpa) | 2.61 | 6.19 | 5.58 | 7.94 | 0.28 | 1.41 | 1.61 |

In Table 3, the lap shear strength of the two-part epoxy based composition samples to stainless steel panels is reported. The two-part epoxy based composition samples in Examples 1-3 had good lap shear strength to 301 stainless steel panels. However, when the amount of the acrylamide compound represented by the general formula (1) was too much as in Example 4, the lap shear strength of the two-part epoxy based composition was significantly reduced.

TABLE 3

Lap shear strength of the cured two-part epoxy based composition to stainless steel

| | Example 1 | Example 2 | Example 3 | Example 4 |
|---|---|---|---|---|
| Lap shear strength (Mpa) | 5.53 | 4.98 | 4.75 | 0.76 |

What is claimed is:

1. A two-part epoxy based composition comprising:
   (a) a first part comprising at least one epoxy resin;
   (b) a second part comprising:
      (i) from 5 to 75% by weight of the second part of at least one epoxy resin curing agent; and
      (ii) from 25 to 95% by weight of the second part of at least one acrylamide compound represented by the following general formula (1):

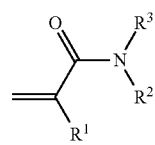

(1)

wherein $R^1$, $R^2$ and $R^3$ are identical or different, and independently represent hydrogen atoms or optionally substituted univalent organic groups; and wherein at least one of $R^2$ and $R^3$ is a hydrogen atom;

wherein a mixture of the first part and the second part can be cured at room temperature to produce a cured product of the two-part epoxy based composition.

2. The two-part epoxy based composition according to claim 1, wherein the at least one epoxy resin comprises at least two epoxy groups per molecule.

3. The two-part epoxy based composition according to claim 1, wherein the at least one epoxy resin curing agent is selected from at least one of polyamide, amine, imidazole and the derivatives thereof.

4. The two-part epoxy based composition according to claim 1, wherein $R^1$ in the general formula (1) contains a tertiary amino group.

5. The two-part epoxy based composition according to claim 1, wherein at least one of $R^1$, $R^2$ and $R^3$ in the general formula (1) is a group represented by the following general formula (2),

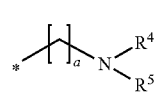

(2)

wherein * represents a bonding position to the nitrogen atom in the acrylamide structure in the general formula (1); $R^4$ and $R^5$ are identical or different, and independently represent hydrogen atoms or optionally substituted univalent organic groups; and a is an integer from 1 to 20.

6. The two-part epoxy based composition according to claim 5, wherein $R^4$ and $R^5$ in the general formula (2) are substituted $C_1$ to $C_6$ univalent organic groups.

7. The two-part epoxy based composition according to claim 1, wherein the at least one acrylamide compound represented by the general formula (1) is present in an amount of from 30 to 90% by weight of the second part.

8. The two-part epoxy based composition according to claim 1,

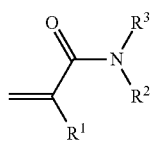

wherein $R^1$ represents a hydrogen atom or an optionally substituted $C_1$ to $C_{10}$ univalent organic group; and wherein one of $R^2$ and $R^3$ is a hydrogen atom, and the other one of $R^2$ and $R^3$ is a group represented by the following formula (2):

(2)

wherein * represents a bonding position to the nitrogen atom in the acrylamide structure in the general formula (1); $R^4$ and $R^5$ are identical or different, and independently optionally substituted $C_1$ to $C_6$ univalent organic groups; and a is an integer from 1 to 10.

9. The two-part epoxy based composition according to claim 1, the weight ratio between the first part and the second part is from 20:1 to 1.

10. A cured product of the two-part epoxy based composition according claim 1.

11. An article bonded by the two-part epoxy based composition according to claim 1.

* * * * *